T. OLINGER.
VETERINARY SURGICAL TABLE.
APPLICATION FILED AUG. 23, 1918.

1,357,416.

Patented Nov. 2, 1920.
5 SHEETS—SHEET 1.

Inventor
Thomas Olinger
By Moulton & Linnane
Attorneys.

T. OLINGER.
VETERINARY SURGICAL TABLE.
APPLICATION FILED AUG. 23, 1918.

1,357,416. Patented Nov. 2, 1920.

Inventor
Thomas Olinger
By Moulton & Lirrance
Attorneys.

T. OLINGER.
VETERINARY SURGICAL TABLE.
APPLICATION FILED AUG. 23, 1918.

1,357,416. Patented Nov. 2, 1920.

Inventor
Thomas Olinger
By Moulton & Livrance
Attorneys.

T. OLINGER.
VETERINARY SURGICAL TABLE.
APPLICATION FILED AUG. 23, 1918.

1,357,416. Patented Nov. 2, 1920.
5 SHEETS—SHEET 4.

Inventor
Thomas Olinger
By Moulton & Liverance
Attorneys.

T. OLINGER.
VETERINARY SURGICAL TABLE.
APPLICATION FILED AUG. 23, 1918.
1,357,416. Patented Nov. 2, 1920.
5 SHEETS—SHEET 5.
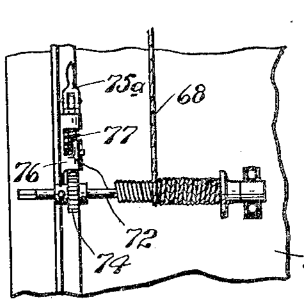
Fig. 7.
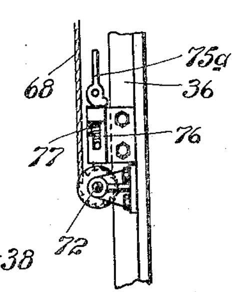
Fig. 8.
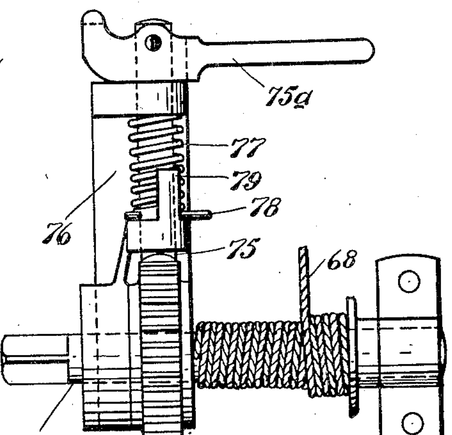
Fig. 9.
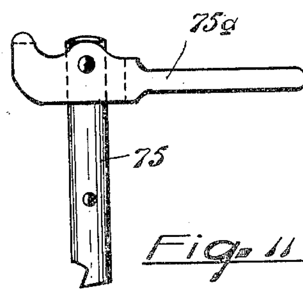
Fig. 11.
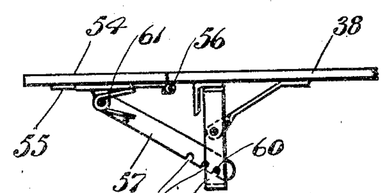
Fig. 10.
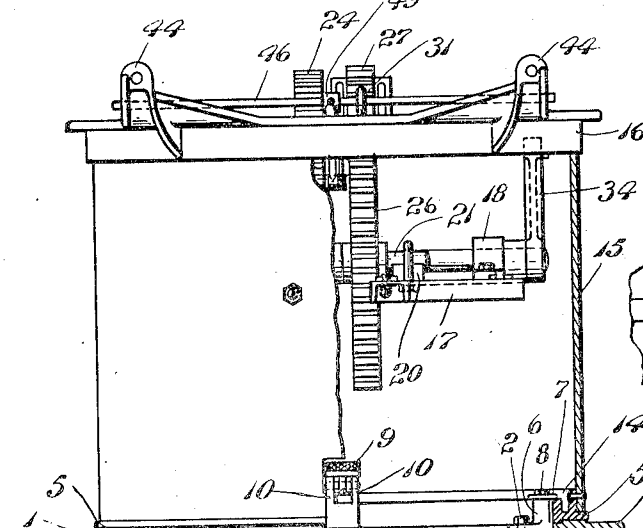
Fig. 6.
Fig. 12.
Inventor
Thomas Olinger
By Moulton & Livrance
Attorneys

UNITED STATES PATENT OFFICE.

THOMAS OLINGER, OF HOLLAND, MICHIGAN, ASSIGNOR TO HOLLAND LIGHTING AND SPECIALTY COMPANY, OF HOLLAND, MICHIGAN, A CORPORATION OF MICHIGAN.

VETERINARY SURGICAL TABLE.

1,357,416. Specification of Letters Patent. Patented Nov. 2, 1920.

Application filed August 23, 1918. Serial No. 251,106.

*To all whom it may concern:*

Be it known that I, THOMAS OLINGER, a citizen of the United States of America, residing at Holland, in the county of Ottawa and State of Michigan, have invented certain new and useful Improvements in Veterinary Surgical Tables; and I do hereby declare the following to be a full, clear, and exact description of the invention, such as will enable others skilled in the art to which it appertains to make and use the same.

This invention relates to a veterinary surgical table, particularly of the type for handling large animals, such as horses, cattle, or the like. It is a primary object and purpose of the invention to provide a table of this character to which the animal may be secured while in standing position and afterward turned to either horizontal or inverted position, the construction of the table permitting such movements. A further object of the invention resides in a novel mechanism for moving the table proper, with reference to its support, from a vertical position at one side of the support to a horizontal position over the support, and thence to an inverted vertical position on the other side of the support. Many other features of novelty, together with novel arrangements of parts for locking the table to the support, will appear as understanding of the invention is had, reference being had to the accompanying drawings showing a preferred form thereof in which, Figure 1 is a front view of the veterinary table, the table proper being in vertical position.

Fig. 6 is a front elevation, with parts broken away and shown in section, of the support for the table and the operating mechanism for said table.

Figs. 7 and 8 are, respectively, a rear elevation and side elevation of the mechanism used for raising the animal body supporting means which is mounted on the table.

Fig. 9 is an enlarged view of a modified form of part of the device.

Fig. 10 is a side elevation showing the adjustable and detachable connection of the head rest at one edge of the table.

Fig. 11 is a side elevation of a detail of structure relating to the adjusting mechanism for the body supporting means, and Fig. 12 is a fragmentary vertical section, enlarged, through the locking mechanism for holding the table support in any position to which it may be adjusted with respect to its base.

Like reference characters refer to like parts in the different views of the drawings.

Figure 1:
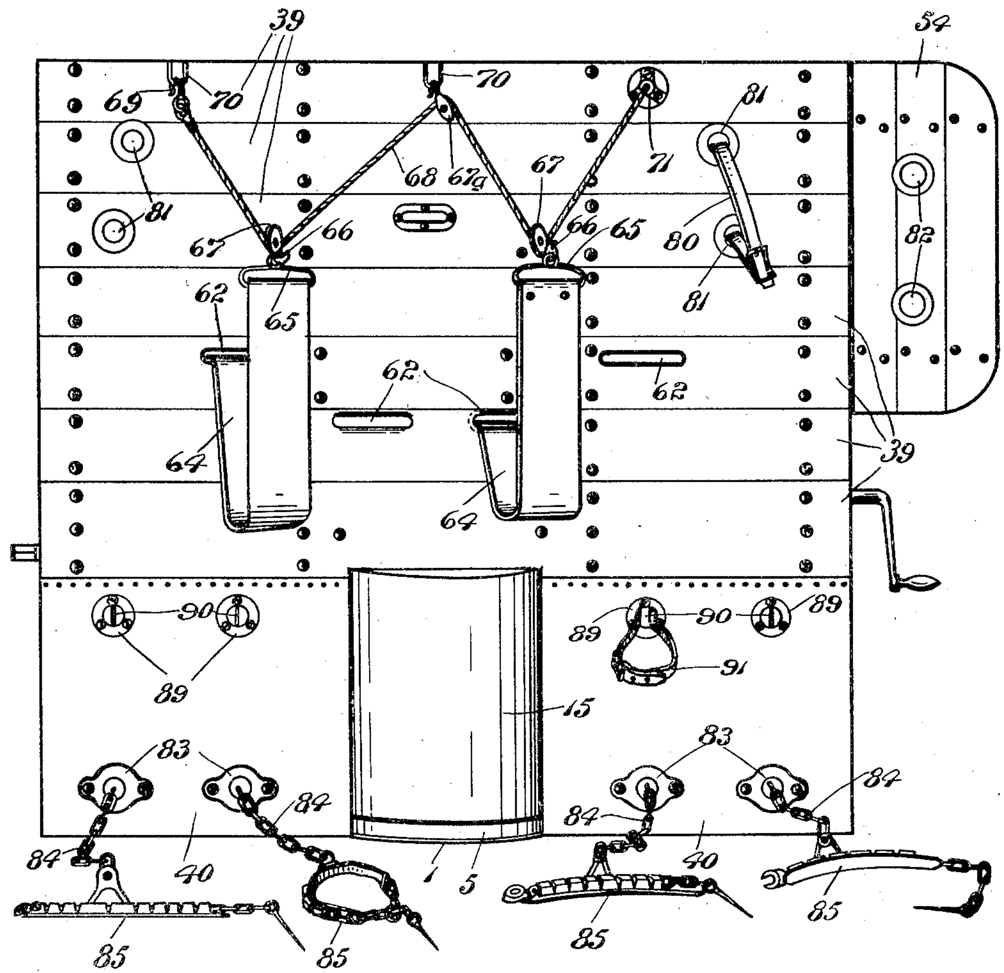

In the construction a base ring 1 is provided which may be secured by set screws or bolts 2 to suitable blocks 3 or the like embedded in a concrete floor 4. In view of the purposes to which the construction of this invention is to be utilized, it is necessary that the base ring 1 have a very firm and secure attachment to the floor or other support, such as shown in Fig. 6, though this particular specific means is not in itself the only securing means which may be used. A second ring 5 is slidably mounted on the base 1 so as to turn about the common center of the two rings, being held against displacement by upwardly extending tongues 6 cast integral with the base ring 1, washers 7 being secured to said tongues at their upper ends by set screws 8 and projecting over the upper edges of the ring 5 to further hold the same against tilting. In practice a foot pedal or lever 9 is pivotally mounted between two outstanding ears 10, located in front of and cast integral with the ring 5, to the inner end of which lever a locking pin 11 is secured, the same passing downwardly loosely through an opening in the ring 5 and entering any one of a plurality of holes 12 bored in the upper side of the ring 1 as shown in Fig. 12. A spring 13 normally forces the locking pin in a downward direction to enter a hole 12 and it is apparent that the upper ring 5 may be adjusted to and held in any one of a number of different positions with respect to the fixed base ring 1.

The ring 5 is provided with an annular upstanding portion 14 around which a cylinder 15 of sheet metal is placed and secured at its lower edges by rivets or other suitable permanent connections. This cylinder extends upwardly for a distance and at its upper end a ring 16 is fixed on which the table proper is adjustably mounted, as will later appear.

Figure 5:
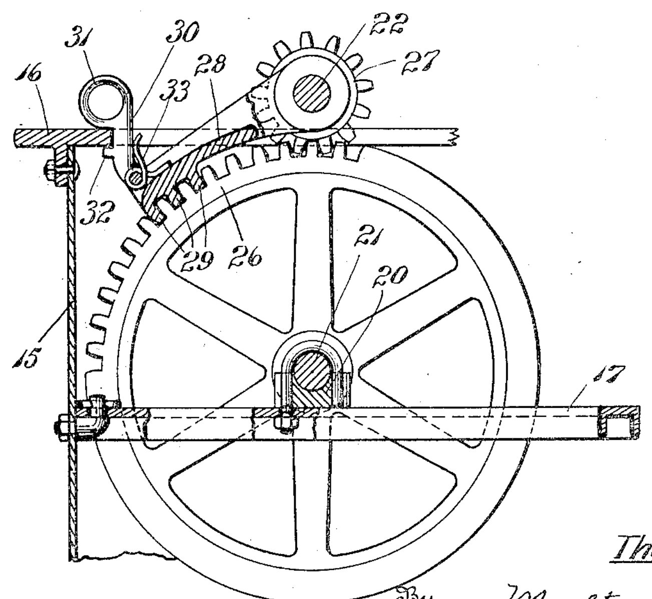
Fig. 5 is a fragmentary vertical section through the locking mechanism for holding the table and its operating mechanism in any position to which it may be adjusted.

Two supporting bars 17 are located horizontally within the cylinder 15, being detachably attached at their ends to sides of the cylinder, as shown in Fig. 5. A bearing 18 is secured to and above each of the bars 17 in which a shaft 19 is rotatably mounted. Similarly, other bearings 20 are attached to the upper sides of bars 17 in which a second shorter shaft 21 is rotatably mounted. A third shaft 22 is positioned above the shafts 19 and 21 and is rotatably mounted in bearings 23 fixed on and above the ring 16. A gear segment 24 of relatively large radius is secured to the shaft 19 meshing with a pinion 25 fixed on the shaft 21. A gear 26 is also fixed on shaft 21 a short distance from the pinion 25 and is in mesh with a pinion 27 fixed on the shaft 22. Shaft 22 is formed at its ends to receive a suitable winding crank by means of which it may be manually rotated, it being evident that rotation of the shaft 22 drives the shaft 19 through the interposed gearing described.

A locking dog 28 is loosely mounted at one end on the shaft 22 and extends over the gear 26, being formed at its front end and on its under side with a plurality of depending teeth 29 adapted to pass between teeth of the gear 26, as shown in Fig. 5. A member 30 is pivotally attached at its lower end to the free end of the dog 28 extending upwardly therefrom and formed at its upper end with a finger engaging member 31, while a distance below said ring, a tooth 32 projects from the member 31, the distance between the under side of said member 31 and the tooth being slightly greater than the thickness of the upper ring 16. The tooth 32 and the member 31 are so positioned with respect to the ring 16 and gear 26 that when the teeth 29 are engaged with the gear, the inner edge of the ring 16 may pass above the tooth 32, and normally this engagement is maintained by a spring 33, as shown in Fig. 5. When thus engaged no operation of the shaft 22 and mechanism driven thereby is possible, but by grasping the finger member 31, a disengagement from the ring 16 may be effected and dog 28 elevated so that the tooth 32 passes above said ring 16, thus lifting the locking teeth 29 above gear 26 and freeing shaft 22 for rotation.

At each end of shaft 19 a crank 34 is rigidly secured, each having pivotal connection at its outer end with one end of a link 35, said links at their opposite ends being pivotally connected to angle bars 36 forming elements of the construction of the table proper. These angle bars are located in spaced apart relation and together with other angle bars 37 located farther outward, form the under structure of the table 38 which is made up of a series of heavy strong boards 39 fixed very securely to the horizontal flanges of the angle iron members 36 and 37. The lower part of the table is divided whereby two dependent sections 40 are made, one at each side of the support 4. Said dependent sections, preferably, have a metal covering, though this is not a particularly essential feature of the invention. The upper ends of the links 35 are pivotally connected to the dependent legs of angle bars 36 substantially midway between the ends of said bars.

Figure 2:
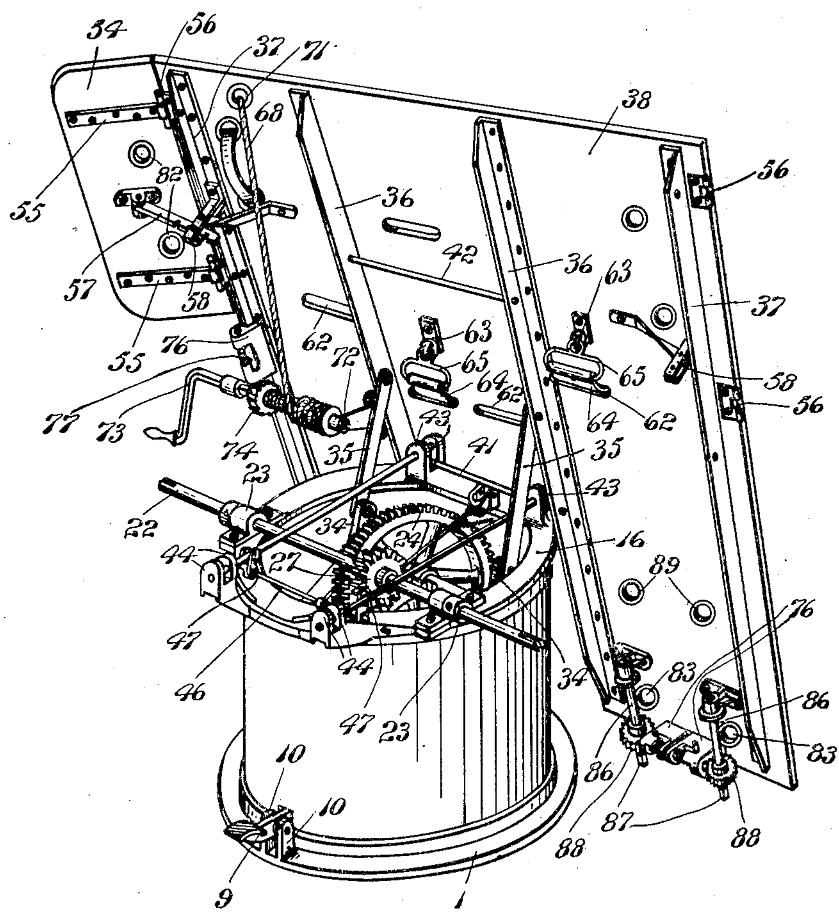
Fig. 2 is a perspective view taken from the rear side thereof.

Lower and upper journal rods 41 and 42 are disposed between the depending flanges of angle bars 36 in spaced apart relation. The lower bar 41 with the table in front vertical position, as shown in Figs. 1 and 2, passes between two spaced apart pairs of lugs 43 cast integral with and extending upwardly from the ring 16, said lugs 43 being located at the upper side of the ring. Ring 16 is also equipped at its rear side with two pairs of spaced apart upwardly extending lugs 44 between which the upper rod 42 is adapted to pass when the table is turned to horizontal position or rear inverted vertical position on proper rotation of the shaft 22, as will be evident.

Two locking rods 45 are disposed between the lugs 43 and 44 at each side of the ring 16, the same passing through openings made in the lugs. Locking rods 45 are of such length that when passed across the space between adjacent lugs 43, the spaces between the adjacent lugs 44 are open and, similarly, the spaces between adjacent lugs 43 are open when the locking rods are moved across the spaces between the adjacent lugs 44. A rock shaft 46 extends between and in front of the lugs 44, being mounted at its ends in suitable projecting portions of the ring 16. To this rock shaft, rocker arms 47 are secured, the same extending upwardly and having a pin and slot connection indicated at 48 with the two locking rods 45. An arm 49 is attached to the rock shaft 46 substantially at its middle point, extending downwardly therefrom.

An operating bar 50 is pivotally connected to the lower end of the arm 49 passing across the cylindrical support to the opposite side of the ring 16, and being formed at its free end with a hand hold 51 which is connected by links 52 with a bracket 53 secured at the upper front side of the ring 16. By manually operating the rod 50 the locking rods 45 may be moved to lock or unlock the journal rod 41 passing between the lugs 43. It will be evident, however, from this construction, that as an operation of the rod 50 necessarily elevates its front end, this operation of unlocking cannot take place until the table has been turned toward horizontal position due to the fact that space enough is not provided for the elevation of the part 51 when the table is in front vertical position.

Figure 3:
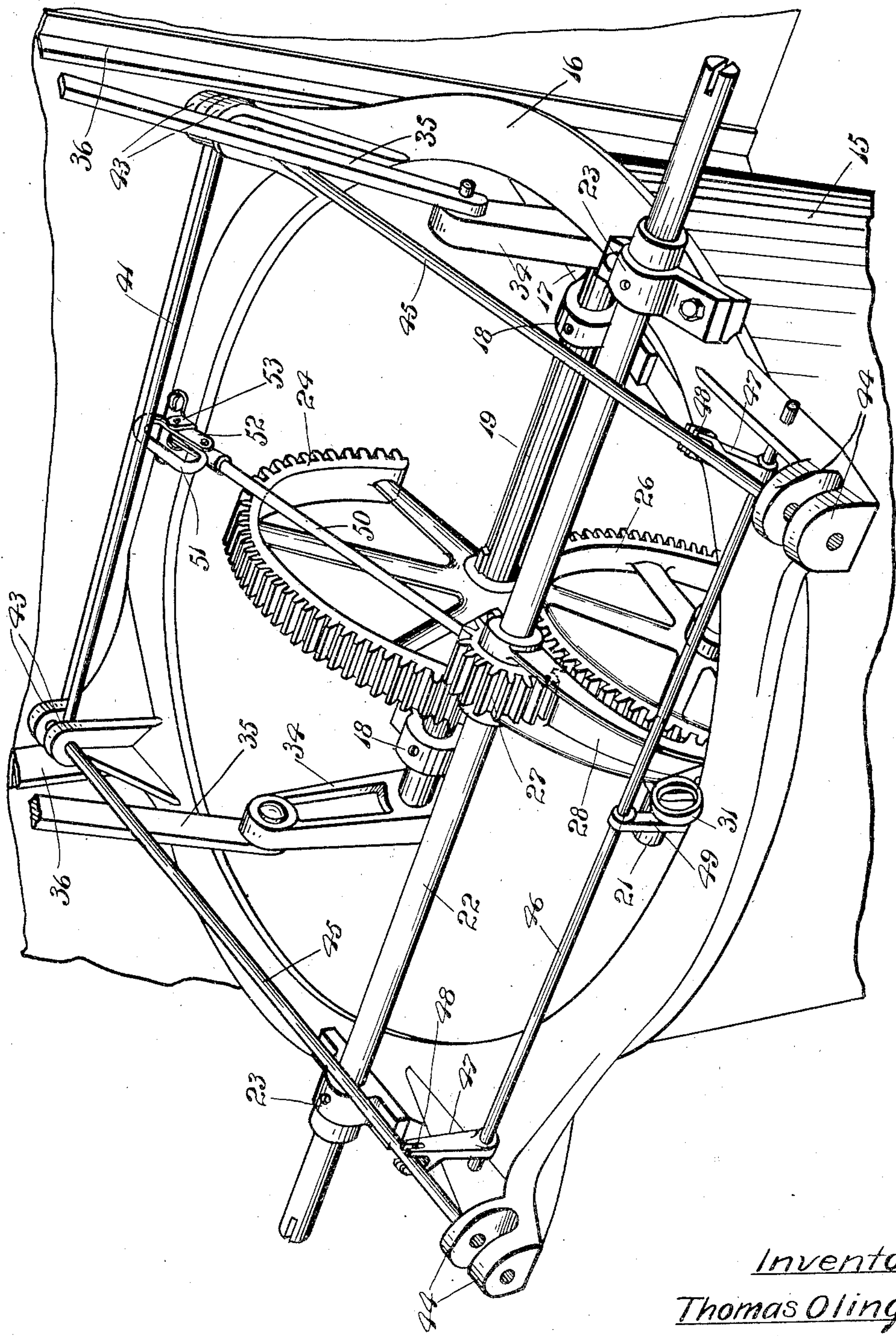
Fig. 3 is an enlarged fragmentary perspective view, taken from the rear side of the table, the connection of the table proper to the support and the novel mechanism for moving the same being shown.
Figure 4:
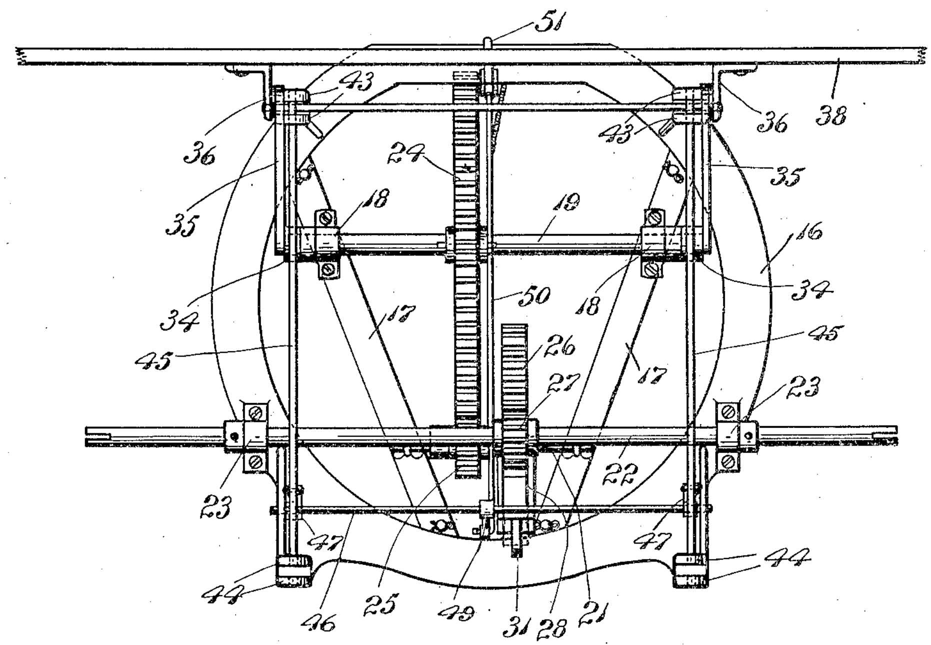
Fig. 4 is a plan of the table and support, the table being located in vertical position and a part only of the same shown.

With the parts in position shown in Figs. 2 and 3, the locking dog 28 may be elevated, after which shaft 22 may be rotated to turn the table about the axis of rod 41 to horizontal position. When the table has reached horizontal position substantially, by grasping the handle 51 and pulling forwardly thereon, locking rods 45 are passed through both pairs of lugs 44 and across the spaces between them, while at the same time, the front ends of the locking rods are moved so as to free the rod 41 and permit it to pass upwardly if necessary. When the table reaches horizontal position, the upper journal rod 42 passes between the pairs of lugs 44 and the operation of the locking rods just described locks this rod 42 against disengagement. Thereupon, by operation of the shaft 22 the table may be turned to the opposite side of the support and in inverted position. This is of value in many instances, as in operation upon animals, a carrying of the same to inverted position may be necessary. When the table is in any desired position, the locking dog 28 in operative position is of utility to prevent any accidental movement of the table toward horizontal position, due to the struggles of the animal, or from any other cause.

A head rest 54 is adapted to be pivotally connected at either end and adjacent the upper portion of the table. Included in its construction are a pair of flat bars 55 on the under side of the head rest which, at their inner ends, are turned back to form hooks adapted to pass around pintles 56 mounted on the table 38, the head rest being detachable from said pintles 56 when moved to a certain position with respect to the table. A brace 57 is pivotally connected to the head rest and passes through a stirrup 58, being formed on its under side with spaced notches 59 in which a cross pin carried by the stirrup may seat to hold the head rest in the same plane with the table 38, or in a lower position as shown in Fig. 2. Normally, the brace 57 is held in any position to which it is adjusted by the spring 61 shown in Fig. 10. The pintles 56 are attached at each end of the table so that the head rest may be changed from one end thereof to the other, as for instance when the animal is brought to the table in different positions with respect thereto.

A plurality of slots 62 are made through the table, above which, on the rear side of the table, hooks 63 are located. Supporting bands 64 pass through the slots and are provided at each end with attaching members 65, those on the rear side of the table hooking over adjacent hooks 63. At the other end the attaching members 65 are detachably connected to hooks 66 connected with pulley blocks 67, the same carrying pulleys and through which a rope or cable 68 is threaded. This cable at one end is connected to a hook 69 which in turn has detachable connection with a suitable attaching device 70, two of which are secured adjacent the upper edge of the table, as shown in Fig. 1. From said device 70 the cable leads through one of the blocks 67, thence upward through a similar block 67ᵃ provided with a hook engaging with the second attaching device 70, thence downwardly through the other pulley block 67 and therefrom upwardly through a sleeve 71 fixed in and passing through the table near its upper edge. After passing through the sleeve, the cable passes down the rear side of the table to and around a shaft 72, rotatably mounted on the rear side of the table and provided with a squared end adapting it to receive a crank 73 for operating the same. A ratchet wheel 74 is fixed on shaft 72 engaging with which is a pawl-shaped end of a rod 75, slidably mounted in a bracket 76, the end of the rod being held against the ratchet wheel by a spring 77. As shown in Figs. 7, 8, and 11, the rod at its upper end is provided with a handle $75^a$ operation of which against the upper end of the bracket 76 withdraws the lower end of the rod 75 from engagement with the ratchet wheel 74, this releasing the shaft for backward rotation if at any time it is necessary. In Fig. 9 a slight modification is shown the lever $75^a$ being located in a different plane in the position which it occupies when the dog is in engagement with the ratchet wheel, it being apparent that upward movement of the outer end of lever $75^a$ automatically disengages the dog from the ratchet wheel. It will be noted that this construction permits an automatic adjustment of the bands 64 to the body of the animal irrespective of different sizes of the body in the places where the bands are applied and by rotation of the crank, the animal may be lifted off of the floor prior to turning the table to horizontal or inverted position.

In addition, the table is equipped with a neck strap 80, passing through the openings 81, and the head rest may also have spaced apart openings 82 through which any similar suitable form of securing strap may be passed to hold the head of the animal against the head rest. It will be noted that the various openings 62 and 81 are duplicated so that the securing attachments may be changed in position when the position of the animal is reversed with respect to the table.

Adjacent the lower edges of the downward extensions 40, two spaced apart sleeves 83 are passed through and connected to each extension through which hopple chains 84 attached to hopples 85 may pass. On the rear side of each downward extension 40, two shafts 86 are rotatably mounted, the lower end of each shaft being squared, as indicated at 87, to receive a suitable operating crank. Chains 84 are connected to these shafts and by rotating the same, the chains may be drawn through the sleeves 83 to bring the hopples closely against the lower extensions 40 of the table. Said hopples are adapted to go around the lower parts of the legs of the animals to secure them firmly to the table. A ratchet wheel 88 is fixed on each shaft 86 engaging with which is a spring actuated rod identical with the rod 75 heretofore described and similarly mounted in identical brackets 76. Above the sleeves 83 various other sleeves 89 are inserted through and secured to the table, having cross pins 90 around which securing straps, such as 91, may be passed for use in further securing the legs of the animal to the table if desired.

The construction as outlined is very strong and durable and is fully capable of sustaining the heavy service to which it is subjected when carrying heavy animals, such as horses, cattle, or the like. The apparatus for securing the animal to the table is complete and is not liable in any way to become disengaged at any time so as to either wholly or partially free the animal from the table. The rotatable mount of the support upon the lower base ring permits a rotation of the entire table and support around a vertical axis, while the locking of the cylindrical support to the lower base member may be had at any time to hold the entire mechanism rigid with respect to vertical rotation. The table may be placed vertically at the front of the support and an animal led alongside the same and very easily secured in place on the table, after which the table may be readily turned to horizontal position, or to inverted vertical position, or at substantially any angle between the regular vertical position and the inverted vertical position. The mechanism for accomplishing this movement of the table is relatively simple yet very strong and durable, having no parts liable to get out of order. All of these features render the table one of merit such that in practice it has proven very successful.

I claim:

1. In a veterinary surgical table, a support provided at opposite sides with open bearings, a table member provided with means for detachably and automatically engaging the open bearings whereby the table is adapted to pivot on either side of the support, and means for operating the table and for securing the same in a plurality of positions at either side of the support.

2. In a veterinary surgical table, a support of cylindrical form, a ring at the upper end of the support provided at its front and rear portions with two spaced apart pairs of upstanding lugs, each pair having a recess between the lugs, a table member provided with a rod adapted to enter the recesses between the front pairs of lugs, and with a second rod for entrance into the recesses between the rear pairs of lugs, means for alternately locking the rods in their respective recesses, and means to turn the table from vertical to horizontal position on one rod and from horizontal to inverted vertical position on the other rod, substantially as described.

3. In a veterinary surgical table a support, a table provided with spaced transversely disposed pivots located at opposite sides of the support when the table is in a horizontal position, open bearings carried by the support and spaced apart a distance corresponding with the space between the said pivots and arranged to receive the same when the table is swung downwardly to a horizontal position, and locking means movable back and forth to engage with a pivot in either of the said bearings and having a single operating member for arranging it to lock either pivot.

4. In a veterinary surgical table a support, a table provided with spaced transversely disposed pivot rods located at opposite sides of the support when the table is in a horizontal position, open bearings carried by the support and arranged to receive the said pivots when the table is swung downwardly, locking rods mounted on the support and extending between the opposite bearings and having their terminals arranged therein and movable backward and forwardly for securing either of said pivots in the said bearings, a single operating device and means for connecting the operating device with the rods for actuating the same.

5. In combination, a vertical support provided at its upper end at its front and rear sides with two spaced apart pairs of lugs, with a recess between the lugs of each pair, locking rods adapted to pass from rear to front through the front pairs of lugs and from front to rear through the rear pairs of lugs, means connecting the locking rods whereby the same may be moved simultaneously, said locking rods passing through the front pairs of lugs and across the recesses between them, while the recesses between the lugs of the rear pairs are unobstructed and vice versa, a table provided with separated lower and upper journal rods adapted to enter, respectively, the recesses between the front and rear lugs, and means for turning the table about the lower journal rod from vertical to horizontal position and vice versa, and about the upper journal rod from horizontal to inverted vertical position and vice versa, substantially as described.

6. In a veterinary surgical table, a support, a table, a locking means between said support, and table adjustably mounted on the support and comprising two spaced apart slidably mounted locking rods, a rock shaft rotatably mounted and connected to the locking rods to slidably actuate the same on rocking movement of the rock shaft, two separate means on the table adapted to be engaged one by the front ends of said locking rods and the other by the rear ends thereof when the table is in horizontal position over the support, and means to turn the table to different angular positions with respect to said support, substantially as described.

7. In combination, a vertical cylindrical support, a ring secured to the upper end of the support, a table adjustably mounted thereon, a shaft rotatably mounted on said ring, mechanism including a train of gears interposed between said shaft and table for turning the table to a plurality of positions between a vertical position at one side of the support to a vertical inverted position at the opposite side of the support, a locking dog mounted on the shaft and detachably engageable with one of the gears to hold the table in any position to which it may be moved, and a member attached to the locking dog and engageable in two different positions with said ring at the upper end of the support, one position holding said dog in engagement with said gear and the other holding it out of engagement therewith.

8. In a veterinary surgical table, a support, a table provided with spaced transverse pivots located at opposite sides of the support when the table is in a horizontal position, open bearings mounted on the support and arranged to receive the said pivots of the table when the latter is swung downwardly to the support, rods extending between the opposite bearings and arranged to lock either pivot in the bearings, an operating shaft journaled on the support and extending across the same between the support and the said rods, gearing located within the support and connected with and actuated by the said shaft and having a crank element and means for connecting the crank element with the table centrally thereof for raising the table when the same is pivoted at either side of the support.

9. In a veterinary surgical table, a support, a table having spaced transverse pivots located at opposite sides of the support when the table is in the horizontal position, open bearings carried by the support and arranged to receive the said pivots when the table is swung downward to the said support, rods extending across the table between the open bearings and movable back and forth to lock either pivot in the bearings, a single operating means for the said rods, an operating shaft arranged beneath the rods and extending across the support and operable from either side thereof a train of gears connected with the said shaft and having crank elements and links connected with the crank elements and with the table centrally thereof for raising and lowering the table when the same is pivoted to either side of the support.

In testimony whereof I affix my signature.

THOMAS OLINGER.